Patented Jan. 8, 1935

1,986,883

UNITED STATES PATENT OFFICE 1,986,883

DYEING OR OTHERWISE COLORING OF MATERIALS MADE OF OR CONTAINING CELLULOSE ESTERS AND ETHERS

George Holland Ellis and Henry Charles Olpin, Spondon, near Derby, England, assignors to Celanese Corporation of America, a corporation of Delaware No Drawing. Application June 22, 1928, Serial No. 287,646. In Great Britain July 20, 1927

18 Claims. (Cl. 8—5)

This invention relates to the dyeing, printing stencilling or otherwise coloring of yarns, threads, knitted or woven fabrics or other products made with or containing cellulose acetate or other organic acid esters of cellulose, such for example as cellulose formate, propionate or butyrate or the products obtained by the treatment of alkalized cellulose with sulpho-chlorides (e. g. the product obtained with p-toluene sulpho-chloride and known as "immunized cotton"), or made of or containing cellulose ethers, such as methyl cellulose, ethyl cellulose, or benzyl cellulose, or the corresponding condensation products of cellulose and glycols or other polyhydric alcohols, all of which cellulose derivatives are hereinafter referred to as organic substitution derivatives of cellulose.

We have found that very valuable colorations are obtainable on materials made with or containing cellulose acetate or other of the organic substitution derivatives of cellulose with coloring matters containing one or more keto-acidyl groups and especially one or more acetoacetyl groups.

Such coloring matters may belong to any class of dyestuff such for example as the azo, nitrodiarylamine, nitrodiaryl, nitrodiarylmethane, or anthraquinone series, but will usually contain no sulpho groups or only a limited number. They may contain, in addition to one or more keto-acidyl groups, other substituent groups such as amino, substituted amino, hydroxy, alkoxy, halogen, carboxylic, or mercapto groups or the like and may be soluble or insoluble in water.

We have further found that valuable colorations are obtainable by forming dyestuffs on the material itself by diazotizing an amino-(ketoacidylamino) or amino-(keto-acidylamino)-azo compound on the material and developing with a suitable developer or by treating first with the "developer" and then with the diazo body obtained by diazotizing such a compound or by coupling an amino or aminoazo compound on the material with an acetoacetic arylide, again either body being applied first.

Thus for example an amine or an aminoazo compound may be applied to the material, diazotized and the dyestuff developed with di-acetoacetyl-tolidide. If, at the time of applying the arylide, the fibre does not already contain the diazo compound, the arylide should be applied in the free state.

Coloring matters or compounds which are insoluble or insufficiently soluble in water may be applied in suspension or may be dispersed in water for example by dissolving in a solvent and mixing the solution with water containing if desirable protective colloids or dispersing agents, by grinding, or by pretreating the coloring matters or compounds with dispersing agents, e. g. those referred to in U. S. Patents Nos. 1,618,413 and 1,618,414, 1,690,481, 1,694,413 and 1,716,721, or by using sulfo naphthalene or other sulfo aromatic ricinoleic acids or salts of such acids. Alternatively they may be dissolved in any suitable solvents and applied by "dry dyeing" methods.

The solutions, suspensions or dispersions may be applied to the materials by any methods known in the dyeing arts or they, and particularly the solutions in organic solvents, may be applied by spraying as described in U. S. application S. No. 273,436 filed April 27, 1928. For printing or stencilling they may be thickened with flour, starch, gum, dextrin or other thickeners.

If the coloring matters of the present invention contain diazotizable amino groups, they may be diazotized on the fibre and developed with any suitable developers.

For the production of compound shades the coloring matters of the present invention may be mixed with any other dyestuffs (diazotizable or otherwise) or components suitable for dyeing the cellulose derivative, for example basic dyestuffs, indigoid dyestuffs or esters of leuco indigoid dyestuffs or the insoluble colors now generally applied to cellulose acetate, for example coloring matters of any of the classes enumerated in prior U. S. Patents Nos. 1,618,413, 1,600,277 and 1,618,415, 1,694,414 and 1,679,935.

The processes of the present invention may be applied to the dyeing or otherwise coloring of mixed materials comprising, in addition to cellulose acetate or other organic substitution derivatives of cellulose, silk, wool, or cotton or other cellulosic fibres, natural or artificial. The said other components may be dyed before, after or together with the cellulose ester or ether portion, for example with dyestuffs having no affinity for the ester or ether. For instance cotton, silk or wool may be dyed with direct cotton colors, or acid colors or anthraquinone vat colors, the cellulose acetate or other ester or ether being dyed with the keto-acidyl colors of the present invention.

As examples of keto-acidyl colors which may be applied in substance according to the present invention the following may be mentioned, but it will be understood that any other suitable keto-acidyl colors may be used:—

Azo group

Acetoacetylaminoazobenzene___ Greenish-yellow
Benzoylacetylaminoazobenzene_ Yellow
4-Chlor-2-nitrobenzene-azo-
  acetoacetic ester_____ Greenish-yellow
Benzene-azo-benzene-azo-aceto-
  acetic ester_____ Golden yellow

Diphenylamine group 2.4-Dinitro-4'-acetoacetylamino-
  diphenylamine_____ Golden yellow
4-Chlor-2-nitro-4'-aceto-acetyl-
  aminodiphenylamine_____ Golden orange

Anthraquinone group

α-Acetoacetylaminoanthra-
  quinone_____ Yellow
1.4-Diacetoacetylaminoanthra-
  quinone_____ Orange The following examples illustrate the invention but are not to be regarded as limiting it in any way:—

Example 1

To dye 100 lbs. of cellulose acetate knitted fabric a bright greenish yellow shade:—
1 lb. of finely powdered acetoacetylamino-azobenzene is ground with 5 lbs. of Turkey red oil (50%) at 90-95° C., diluted with boiling soft water, and the dispersion thus obtained is passed through a filter cloth into a dyebath containing 300 gallons of a ¼% soap solution. The well wetted out goods are entered, and dyeing carried out for ¾ hour while raising the temperature from the cold to 75° C. and for a further ¾ hour at 75° C. The goods, which are now dyed a bright greenish yellow shade are lifted, rinsed, and dried or otherwise treated as requisite.

Example 2

To dye 100 lbs. of cellulose acetate knitted fabric, a bright golden yellow shade:—
1½ lbs. of 2:4-dinitro-4'-acetoacetylamino-diphenylamine are finely ground and heated with stirring with a dispersion of 1 lb. tetrahydronaphthalene in 6 lbs. of Turkey red oil 50% till as homogeneous as possible. The liquor is then diluted carefully with 10 gallons of boiling soft water and passed through a filter cloth into a dyebath containing 300 gallons of a ¼% soap solution. The wetted-out goods are now entered, and dyeing carried out for ¾ hour while raising the temperature from the cold to 75° C. and for a further ¾ hour at 75° C. The goods are then lifted, rinsed and dried or otherwise treated as requisite.

Example 3

To dye 100 lbs. of cotton/cellulose acetate goods (50:50), the cotton a green shade, and the cellulose acetate orange:—
The cotton portion is first dyed as follows:—
240 gallons of soft water are heated to 30° C. and 15 gallons of sodium para-cresolate 32.5% solution added. Into this is sieved 10 lbs. of Caledon Jade green paste (Color Index No. 1101). 2.6 lbs. of sodium hydrosulphite powder are now dredged in and the bath stirred gently until reduction is complete. The previously scoured material is entered into the bath in a suitable machine and worked for 20 minutes while the temperature is raised to 50° C. and for a further 15 minutes at this temperature, when the goods are removed from the bath, squeezed and oxidized in a bath, containing 1 gram of soap and 1 gram of sodium perborate per litre, at 75° C.

The cellulose acetate is now dyed as follows:—
1 lb. of 1.4-di-(acetoacetylamino)-2-methyl-anthraquinone is ground to a fine powder, and added with stirring to 8 lbs. of 50% naphthenic acid in the form of its sodium salt. The whole is heated at 95° C. till as homogeneous as possible and then diluted carefully with 10 gallons of hot soft water. The whole is then passed through a filter cloth into a bath containing 250 gallons of a ¼% soap solution, and dyeing carried out for ¾ hour while raising the temperature from the cold to 75° C. and for a further ¾ hour at 75° C. To clear the cotton of any loosely adhering color a light soaping is then preferably given, after which the goods are rinsed, and dried or otherwise treated as requisite.

Example 4

To dye 100 lbs. of cellulose acetate knit fabric a full yellow shade:—
3 lbs. of diacetoacetyl-ortho-tolidide are dissolved in 6-7 gallons of hot water containing 1½ lbs. caustic soda, and poured into a 300 gallon dyebath containing 2½ grams of soap per litre. To this solution is then added cautiously 2¼ lbs. of glacial acetic acid in 2 gallons of water. The bath is agitated continuously to ensure fine dispersion of the diacetoacetyl-ortho-tolidide thus precipitated from solution.

The well wetted out goods are now entered and the bath heated from cold to 80° C. in ¾ hour and maintained at this temperature a further hour. The goods are now lifted, rinsed, and developed in a 150 gallon bath containing 10 lbs. of p-nitro-diazonium chloride prepared in the usual manner, and to which sodium acetate has been added to neutralize mineral acid. The goods are worked in this bath for 1 hour in the cold, when development is complete and are then lifted, rinsed and dried or otherwise treated as requisite.

Example 5

To dye 100 lbs. of cellulose acetate yarn in hank form a golden brown:—
1 lb. of p-nitrobenzene-azo-p-xylidine is ground to a fine powder and sieved into 5 lbs. of Turkey red oil (50%). The whole is heated, with stirring, to 90-95° C., and, when as homogeneous as possible, slowly diluted while stirring with 10 gallons of hot soft water. The dispersion is then added through a filter cloth into a 300 gallon bath set with ½ gram of olive oil soap per litre.

The goods are now entered worked for ¾ hour from the cold to 80° C. and for a further ¾ hour at 80° C. They are lifted, rinsed and diazotized in a 150 gallon bath containing 4 lbs. of sodium nitrite and 20 lbs. of hydrochloric acid 30° Tw. The goods are worked for 30 minutes in this solution in the cold, lifted and well rinsed. For developing the goods are entered into 300 gallon bath containing 3 lbs. diacetoacetyl-ortho-tolidide dissolved in 1½ lbs. caustic soda, and 3 lbs. Turkey red oil 50%. The shade is fully developed after 1 hour's treatment cold to 40° C., and the goods are then lifted, rinsed and dried or otherwise treated as requisite.

Instead of the cellulose acetate materials treated in the above examples, materials made with or containing other organic substitution derivatives of cellulose, for example cellulose formate, cellulose propionate, methyl cellulose, ethyl cellulose, or "immunized cotton" may be similarly colored.

The term dyeing used in the appended claims is to be understood to include printing, stencilling and otherwise coloring.

What we claim and desire to secure by Letters Patent is:—

1. Process for dyeing materials comprising organic substitution derivatives of cellulose, comprising applying thereto in substance coloring matters containing a radical selected from the group consisting of the $CH_3.CO.CH_2CO-$ and the $C_6H_5CO.CH_2CO-$ radicals.

2. Process for dyeing materials comprising organic substitution derivatives of cellulose, comprising applying thereto in substance unsulphonated coloring matters containing $CH_3.CO.CH_2CO-$ groups.

3. Process for dyeing materials comprising cellulose acetate, comprising applying thereto in substance coloring matters containing $$CH_3.CO.CH_2CO-$$

groups.

4. Process for dyeing materials comprising cellulose acetate, comprising applying thereto in substance unsulphonated coloring matters containing $CH_3.CO.CH_2CO-$ groups.

5. Process for dyeing materials comprising cellulose acetate, comprising applying thereto in substance unsulphonated azo coloring matters containing $CH_3.CO.CH_2CO-$ groups.

6. Process for dyeing materials comprising cellulose acetate, comprising applying thereto in substance in aqueous dispersion unsulphonated coloring matters containing $CH_3.CO.CH_2CO-$ groups.

7. Process for dyeing materials comprising cellulose acetate, comprising applying thereto in substance in aqueous dispersion unsulphonated azo coloring matters containing $CH_3.CO.CH_2CO-$ groups.

8. Process for dyeing materials containing organic substitution derivatives of cellulose, which comprises applying thereto in substance unsulphonated coloring matters free from azo groups and containing $CH_3.CO.CH_2CO-$ groups.

9. Process for dyeing materials containing organic substitution derivatives of cellulose, which comprises applying thereto in substance anthraquinone dyestuffs containing a single anthraquinone nucleus and a $CH_3.CO.CH_2.CO-$ group.

10. Process for dyeing materials containing organic substitution derivatives of cellulose, which comprises applying thereto in substance a compound selected from the group consisting of α-acetoacetylamino-anthraquinone and 1.4 diacetoacetylamino-anthraquinone.

10. Process for dyeing materials containing organic substitution derivatives of cellulose, which comprises applying thereto in substance an unsulphonated diarylamine containing a $CH_3.CO.CH_2.CO-$ group.

12. Process for dyeing materials containing organic substitution derivatives of cellulose, which comprises applying thereto in substance a compound selected from the group consisting of 2.4-dinitro-4'-acetoacetylamino-diphenylamine and 4-chlor - 2 - nitro-4'-acetoacetylamino-diphenylamine.

13. Process for dyeing materials containing cellulose acetate, which comprises applying thereto in substance coloring matters free from azo groupings and containing $CH_3.CO.CH_2.CO-$ groups.

14. Process for dyeing materials containing cellulose acetate, which comprises applying thereto in substance unsulphonated coloring matters free from azo groups and containing $CH_3.CO.CH_2.CO-$ groups.

15. Process for dyeing materials containing cellulose acetate, which comprises applying thereto in substance anthraquinone dyestuffs containing a single anthraquinone nucleus and a $CH_3.CO.CH_2.CO-$ group.

16. Process for dyeing materials containing cellulose acetate, which comprises applying thereto in substance a compound selected from the group consisting of α-acetoacetylamino-anthraquinone and 1.4-diacetoacetylamino-anthraquinone.

17. Process for dyeing materials containing cellulose acetate, which comprises applying thereto in substance an unsulphonated diarylamine containing a $CH_3.CO.CH_2.CO-$ group.

18. Process for dyeing materials containing cellulose acetate, which comprises applying thereto in substance a compound selected from the group consisting of 2.4-dinitro-4'-acetoacetylamino-diphenylamine and 4-chlor-2-nitro-4'-aceto-acetylamino-diphenylamine.

GEORGE HOLLAND ELLIS.
HENRY CHARLES OLPIN.